March 14, 1967  J. F. LOPRETE  3,309,026
GAS COOLED ROCKET STRUCTURES
Filed May 15, 1964  3 Sheets-Sheet 3
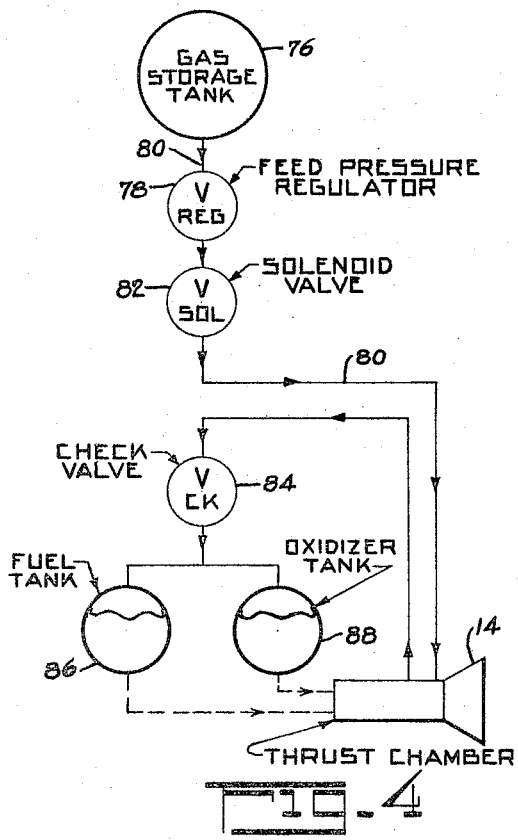
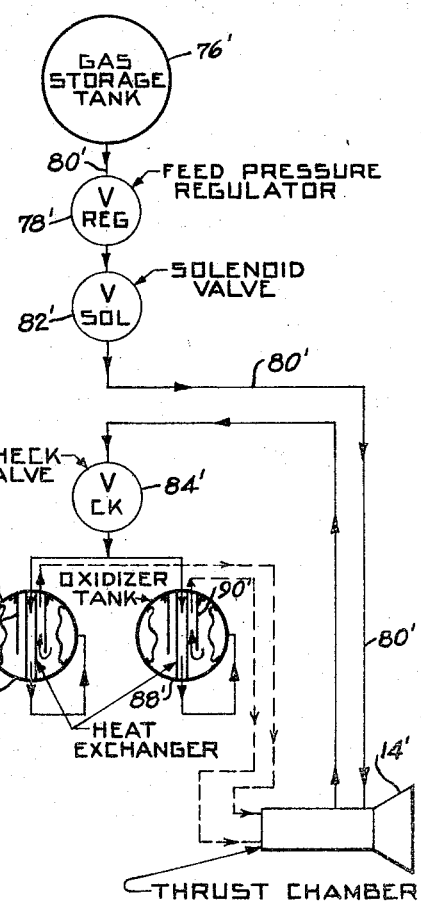
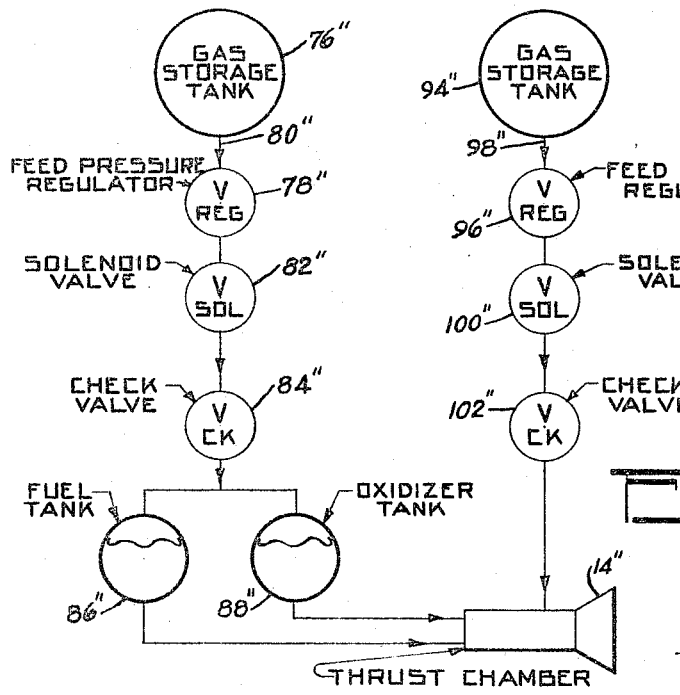
INVENTOR.
JOSEPH F. LOPRETE
BY
ATTORNEY

United States Patent Office 3,309,026
Patented Mar. 14, 1967

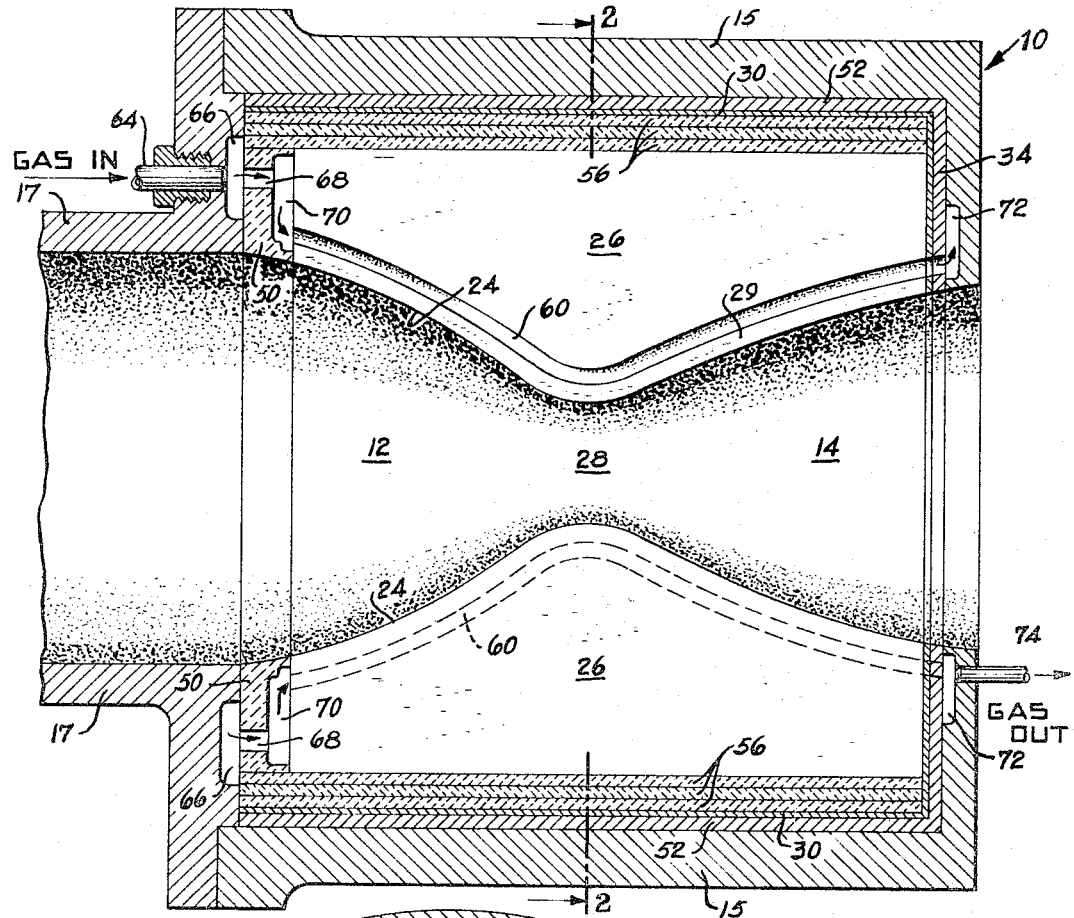
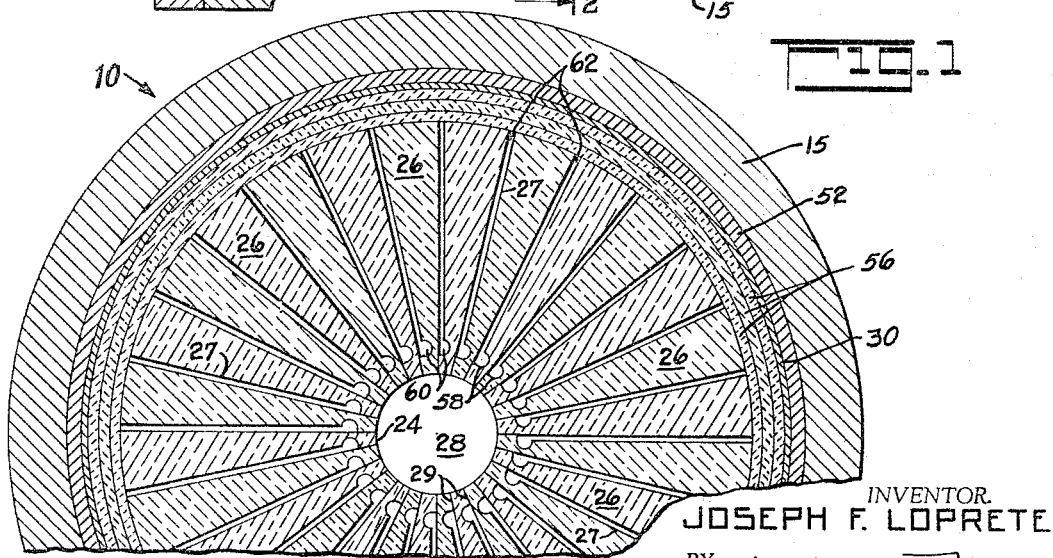

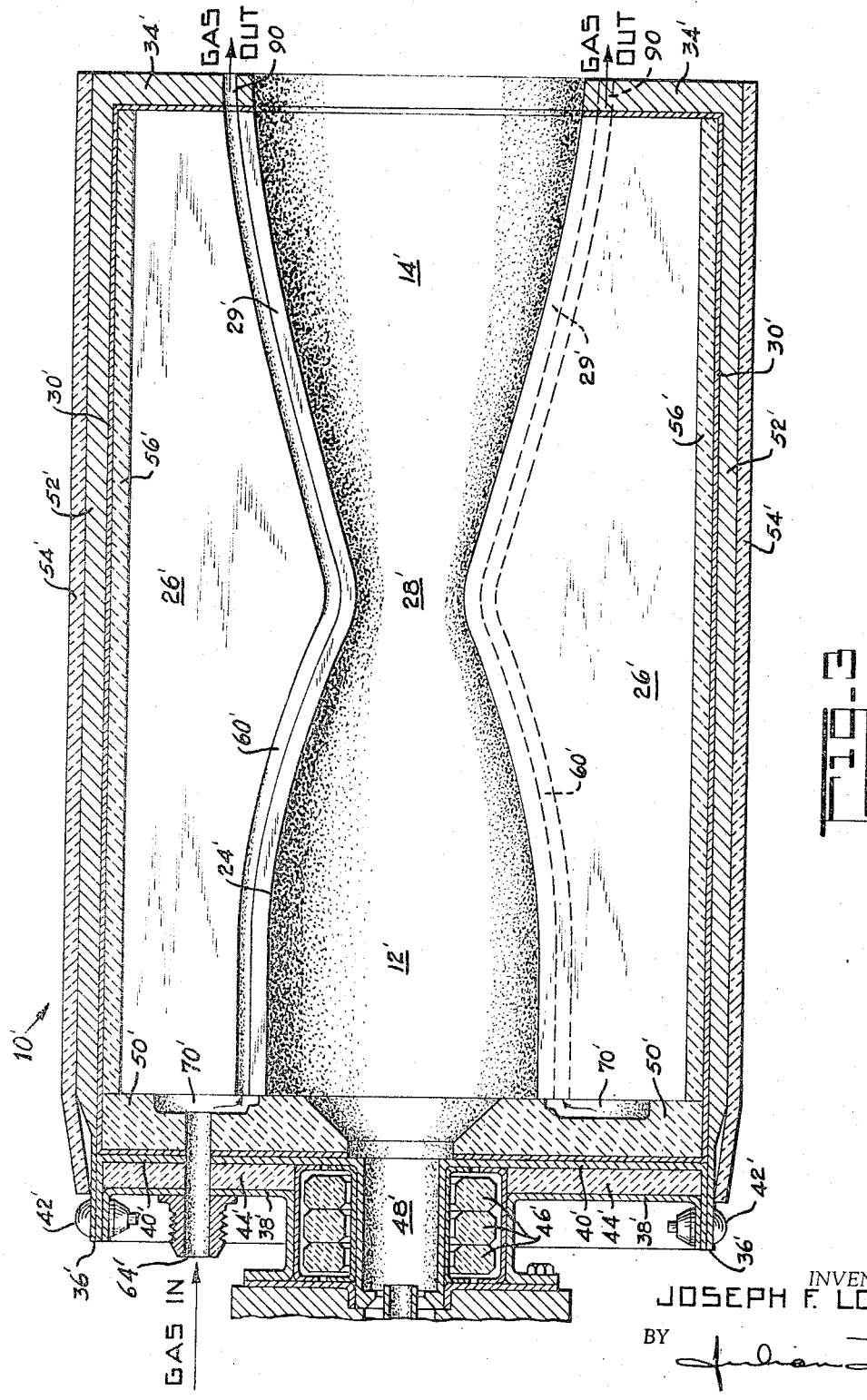

3,309,026
GAS COOLED ROCKET STRUCTURES
Joseph F. Loprete, Wayne, N.J., assignor to Curtiss-Wright Corporation, a corporation of Delaware
Filed May 15, 1964, Ser. No. 367,632
12 Claims. (Cl. 239—265.11)

This invention relates to jet engine or rocket structures and in particular to rocket structures for operation at extremely high temperatures The present application is drawn to an improvement over my co-pending application entitled, "Restartable Rocket Engines." It has been found that the operating temperature range of rocket engines of the type disclosed in my co-pending application can be substantially increased through the use of the present invention. As is well known, there is an ever increasing search for more powerful propellants, both of the liquid and solid types, in order to increase the capabilities of rocket engine powered devices on our own planet and in the field of outer space. With the advent of more powerful propellants, the temperature ranges also tend to rise so that the temperature range capabilities of rocket engines and exhaust nozzles must be correspondingly increased. Thus, the concept of the present invention provides for a substantial increase in the temperature range to which rocket engines and exhaust nozzles can operate and also provides for a novel construction for increasing the restarting capabilities of these structures.

As will be apparent from the description hereinafter, which description relates to a rocket engine although applicable also to an exhaust nozzle for a rocket engine, the engine of the present invention is capable of numerous restarts and relatively high temperature operating ranges due to the novel construction provided for by said invention. The invention generally comprises a rocket structure, which may be an exhaust nozzle or a complete rocket engine, including a combustion chamber and an exhaust nozzle with said structure having an inner or first layer, which is coaxial with the axis of said structure and defines in the case of a rocket engine the inner surface of said combustion chamber and said exhaust nozzle. The first layer is composed of a material which is relatively highly thermally conductive, at least in a direction parallel to the rocket engine axis and also preferably in a radial direction relative to the engine axis. The unique properties of the material used, as will be explained in greater detail below, provides a heat conduction path during cool-down periods of the engine which permits heat to radiate from the engine before temperatures can reach a point which will cause erosion of the inner surface or gas wall. The first layer further comprises a plurality of elements stacked in side-by-side circumferential relationship to form an annulus and is supported by an annular load carrying member. The annular load carrying member preferably is metallic and is constructed so as to be elastically expansible both circumferentially and axially to permit thermal expansion of the stacked elements during firing of the rocket engine so as to avoid excessive stresses in said elements. A layer or coating of material is provided between the first layer and the metallic expansion means which material has the characteristics of preventing contact of the metallic member with the exhaust gases and the first layer so that the metallic member does not become contaminated and lose its elastic properties. Heat insulation means is also provided for preventing conduction of heat axially upstream of the first layer and radially outwardly therefrom. By this means, heat conduction, particularly during cool-down periods between firing of the rocket engine, primarily takes place towards the discharge end of the nozzle portion where the heat radiates from said nozzle discharge portion into the relatively cool surrounding outer environment, the nozzle discharge portion being free of any insulation means, hence, it will be apparent that the rocket engine has the characteristic of conducting heat away from the inner surface of the engine for preventing erosion thereof so that the profile of the inner surface is maintained and the engine may be restarted many times.

In one embodiment of the invention a cooling medium such as a gas or liquid is passed between the stacked elements for removing heat from the first layer. The cooling medium is passed between the stacked elements in a region adjacent the inner surface so that heat absorbed by the inner surface will be transmitted to the cooling medium and will be carried away from said first layer by said cooling medium. The cooling medium may comprise the pressurizing gas in a liquid propellant system and may be fed directly from the storage tank, through suitable regulating valve structure, into passages between the stacked elements where it will absorb heat from said elements. Upon discharge from the passages between the stacked elements, the pressurizing gas may then be fed to the propellant tanks for pressurizing said tanks in order to feed the liquid propellants to the combustion chamber of the rocket engine. This system offers the advantage of using a minimum amount of gas weight while accomplishing both functions of using the gas as a cooling medium and a pressurizing source for feeding the propellants. A heat exchanger means may be provided when the rocket engine is to be used for intermittent operation in order to make the pressure of the gas uniform at the propellant tanks and has the additional advantage of preheating the propellants which, as will be apparent, aids in the combustion of the propellants.

In another embodiment, the cooling gas, after passing between the stacked elements, is discharged directly into the outer environment. Since the gas is heated while passing between the stacked elements, it will be expanded as it is discharged from the stacked elements and as the expanded gas is discharged, it will add thrust to the rocket engine so that the cooling gas serves as a supplementary thrust source. It has been found that the additional use of a cooling medium with the novel construction of the invention substantially increases the operating temperature range for application of the construction of the invention.

Accordingly, it is one object of the invention to provide a novel and improved high temperature operating rocket engine structure having cooling fluid means for removing heat from said structure.

It is another object of the invention to provide a novel high temperature operating rocket engine which is capable of numerous restarts and firing orders.

It is still a further object of the invention to provide a novel structure for a complete rocket engine or for an exhaust nozzle having a plurality of stacked side-by-side circumferentially-aligned elements in which a cooling medium is passed between said stacked elements for transferring and carrying away heat from said elements.

It is still another object of the invention to provide a novel cooling structure for a complete liquid propellant rocket engine or for an exhaust nozzle in a liquid propellant system wherein said structure includes a plurality of stacked elements for the inner surface thereof and in which the pressurizing gas for the propellants is also used as a cooling medium for the inner surface of said rocket engine or said exhaust nozzle.

Additionally it is an object of the invention to provide a novel structure for a complete rocket engine or for an exhaust nozzle in a rocket engine having a first or inner layer composed of a plurality of stacked elements and in which a cooling gas is passed between said stacked elements for transfering heat from said first layer to said cooling gas and said heated cooling gas is expanded into the outer environment for supplementing the thrust of the rocket engine.

Other objects and advantages of the invention will become apparent when reading the following detailed description with the accompanying drawings wherein:

FIG. 1 is an axial sectional view of an exhaust nozzle illustrating one embodiment of the invention;

FIG. 2 is a sectional view taken along line 2—2 of FIG. 1;

FIG. 3 is an axial sectional view of a complete rocket engine illustrating an additional embodiment of the invention; and FIGS. 4–6 are schematic illustrations of propellant systems for use with the embodiments of FIGS. 1 and 3.

Referring to FIG. 1, there is shown therein an exhaust discharge nozzle 10 including an upstream portion 12 leading from a combustion chamber of a rocket engine and an exhaust nozzle discharge portion 14 at the downstream end thereof. As viewed in FIG. 1, the exhaust nozzle 10 has a convergent-divergent profile. The exhaust nozzle 10 has an inner surface 24 formed by a first layer with, as stated above, the exhaust nozzle 10 thereof having a converging-divergent profile.

The first or inner annular layer of the annular casing for the exhaust nozzle 10 is formed from a plurality of abutting wedge-shaped pieces 26 of pyrolytic graphite stacked circumferentially in side-by-side relation to form an annulus in a manner which will be more clearly explained below. As will also be explained in greater detail below, pyrolytic graphite possesses unique properties which properties are applied in the invention to provide heat conduction away from the inner surface 24 of the exhaust nozzle 10 and particularly away from the nozzle throat 28.

Pyrolytic graphite is normally deposited on a substrate layer which substrate layer usually is a conventional graphite. As the pyrolytic graphite is deposited it forms a layer having marked anisotropic properties. In any direction parallel to the plane of the deposited layer, pyrolytic graphite is highly thermally conductive and has a relatively low coefficient of thermal expansion, while in a direction perpendicular to the plane of deposit, the material is highly non-conductive but with a relatively high coefficient of thermal expansion in this direction. Pyrolytic graphite significantly has high heat conduction properties even at the extremely high temperatures that graphite can withstand. In addition the heat insulating property of pyrolytic graphite increases with increase in temperature. As stated above, the present invention makes use of these properties to provide a heat sink construction with sufficient capacity to substantially eliminate erosion of the inner surface or gas wall of the exhaust nozzle and in particular in the regions where the temperatures are relatively extreme, such as for example, the nozzle throat 28.

As previously mentioned, the wedges 26 of the first layer are preferably formed from pyrolytic graphite which material has definite anisotropic properties. The pyrolytic graphite is obtained in a furnace by vapor deposition from carbon bearing vapor. The pyrolytic graphite wedges 26 are formed by depositing carbon on a flat surface, the carbon being deposited on said surface to form a layer of pyrolytic graphite of sufficient thickness so that wedges of desired thickness to be used in said exhaust nozzle can be cut and machined from said layer. It is known that the thickness to which pyrolytic graphite can be deposited is limited and therefore the wedge thickness is likewise limited. However, if it is found that the pyrolytic graphite can be deposited in greater thickness then of course, thicker wedges and therefore a lesser number may be used. The wedge structure itself is formed by cutting and machining such a deposited layer of pyrolytic graphite such that a median plane between the sides of the wedge is substantially parallel to the plane of deposit of the pyrolytic graphite. The inner surface 24 of the exhaust nozzle is then built up from a plurality of such wedges 26 disposed in a circle to form a substantially annular ring-shaped layer about the axis of said exhaust nozzle. The wedges 26 of the invention have their layer or deposited plane disposed so that said plane substantially includes the nozzle axis about which said wedges 26 are circumferentially arranged to form an annular shape or layer coaxial with said axis.

As can be seen in FIG. 1, the wedges 26 each extend substantially the entire length of the exhaust nozzle 10 and have a profile which defines the inner surface of said exhaust nozzle 10 including the throat portion 28. It will be seen therefore, that each wedge member 26 is made up of layer planes of pyrolytic graphite which extend along the length of said wedge and the exhaust nozzle 10 is constructed so that each layer plane lies in a plane passing through the axis of said exhaust nozzle 10.

In directions parallel to the plane of deposit of the pyrolytic graphite, the pyrolytic graphite has excellent heat conduction properties while in a direction perpendicular to the plane of deposit pyrolytic graphite is an excellent heat insulator. Thus, with reference to FIGS. 1–3 it will be seen that, in directions longitudinally and radially relative to the axis of the exhaust nozzle, as well as in any direction parallel to the surfaces or median plane of each of the wedges 26, there will be good heat conduction while in a direction substantially perpendicular to the median plane of each of the wedges 26, there will be little, if any, heat conduction. From the illustrations of FIGS. 1 and 2, it will be apparent that when a plurality of wedges 26 are disposed in a manner to form the exhaust nozzle interior, the exhaust nozzle will have high heat conduction in directions parallel to the nozzle axis and radially from said axis. However, in a circumferential direction with respect to said axis, that is, in a direction from one wedge 26 to an adjacent wedge 26, the nozzle will have high heat insulating properties with little heat being conducted around the nozzle in a circumferential direction. It will be apparent therefore that heat from the combustion gases which is transferred to the wall of the nozzle 10 will be relatively rapidly conducted away radially outwardly from the inner surface 24 thereof and then in a generally axial direction. Thus, it will be seen that heat saturation of the inner surface of the nozzle is delayed by allowing the heat to flow into portions of the nozzle which are relatively cool, which thereby forms a very efficient heat sink and prevents the inner surface from reaching temperatures which may cause decomposition of the inner surface or gas wall 24 of the exhaust nozzle 10. It should also be noted that the capacity of the heat sink construction of the invention may be further increased by increasing the radial depth of the first or inner layer. Reference may be made for a more complete and detailed description of the use of pyrolytic graphite and its properties to co-pending application Ser. No. 125,253 filed July 19, 1961, by George Kraus and application Ser. No. 290,395 filed June 25, 1963, by Joseph Loprete and Arthur Cangialosi, both said applications being assigned to the assignee of the present application.

Pyrolytic graphite is also characterized by the fact that it has a relatively high rate of thermal expansion in the direction of good heat insulation. Thus, in the present embodiment of the invention, as illustrated in the drawings, the exhaust nozzle 10 will have a relatively high rate of thermal expansion in the circumferential direction relative to the axis of said nozzle. However, pyrolytic graphite is also characterized in that it has a relatively low rate of thermal expansion in the direction of good heat conduction which in the present invention will be in the axial and radial directions relative to the axis of the nozzle which therefore eliminates a problem present in prior rocket structures of thermal expansion in the axial direction. This eliminates the need for providing bulky expansion joints to compensate for the axial thermal expansion. However, it is also within the scope of the invention to provide means for compensating for any slight expansion in the axial and radial directions.

In order to compensate for the thermal expansion in the circumferential direction of the pyrolytic graphite wedges 26 and for supporting the wedges against the internal pressure of the nozzle, a cylindrically-shaped metallic member 52 is provided in surrounding load carrying disposition relative to the first or inner layer of wedges 26. The metallic member 52 is preferably composed of a high temperature metal such as a tungsten alloy material and is provided with a plurality of cutout portions not shown. The cutout portions are disposed at an inclined angle relative to the axis of said member 52, so that when said member 52 is under stress, the cutout portions permit the metallic member 52 to elastically yield or expand more readily to internal pressure. Thus, it may be said that the member 52 has spring-like characteristics. Therefore, when the member 52 is under the stresses resulting from expansion in the circumferential direction of the layer consisting of the pyrolytic wedges 26, the metallic member 52 will yield more readily to allow expansion between adjacent wedge members 26. The expansion permitted by the member 52 in the circumferential direction is limited or restrained so that the member 52 also serves to maintain alignment of the wedge members 26 relative to one another so that the profile of the inner surface 24 and the annular shape of the nozzle 10 is maintained. Reference may be made to my co-pending application entitled "Restartable Rocket Engines" for a more complete description and illustration of the expansion member 52, the details of which form no part of the present invention.

As viewed in FIG. 1, it will be seen that the member 52 has a turned-in flange portion 34 which partially encloses the wedge members 26 at the discharge end of the exhaust nozzle 10. This portion 34 at the discharge end of the nozzle serves to hold the wedge members 26 against the axially rearward force exerted by the rocket combustion gases against the members 26 thereby maintaining axial alignment of the wedge members 26 and at the same time permitting a limited amount of axial expansion, which as stated above is very low since the wedge members are relatively highly thermally conductive in the axial direction with relatively low expansion in this direction. The axial expansion of the wedge construction has been found to be in the neighborhood of 0.004 inch per inch of length. Thus, it will be seen that the member 52 serves to provide limited or restrained expansion of the wedge construction both circumferentially and axially while maintaining alignment of the stacked wedge elements 26 and as a result the hoop stresses produced in the nozzle will be taken up by the elastically yieldable member 52 for preventing destruction of the wedge construction of the nozzle 10.

Disposed at the upstream end of the first or inner layer 26, that is at the upstream end of the portion 12 of the nozzle 10 is an annular member or ring of pyrolytic graphite 50. The annular member 50 has its plane of deposit oriented in a direction perpendicular to the nozzle axis so that in the direction parallel to the nozzle axis the annular member 50 is relatively highly thermally non-conductive. Thus, it will be apparent that heat conduction from the first layer or the wedges 26 in an upstream direction is substantially prevented due to the insulating properties of the annular member 50. Therefore, heat will be substantially prevented from flowing in the axial upstream direction from the upstream end of the first layer since the annular member 50 provides an insulating barrier limiting any heat conduction therethrough. At the downstream end of the nozzle 10 it will be seen from FIG. 1 that the nozzle 10 is free of any insulating material which might prevent heat conduction in an axial direction toward the discharge end. The absence of any insulating means at the discharge end of the rocket engine is significant to the function of the rocket engine in enabling said engine to be restarted many times.

As illustrated in FIGS. 1 and 2, each of the wedges 26 is further provided with a cut-back portion or undercut 27 along a substantial portion of one of its faces with a portion thereof not being undercut to leave a land 29 at the radially inner portion thereof, as viewed in FIGS. 1 and 2. The undercut portions 27 allow for limited area contact of the lands 29 between the wedges 26 due to thermal expansion in the circumferential direction and since the lands 29 are disposed at the radially inner edges of the wedge members 26, said lands 29 insure that the wedges 26 will abut against one another in the region of the gas wall or inner surface of the wedge layer 26 for preventing gas leakage between adjacent wedges 26. The undercuts 27 make the area of contact of the restrained material more uniform and minimizes the load carried by the member 52. This also minimizes the non-uniformity of the restraining loads over the length of the member 52 so that said member may be made of substantially uniform thickness. Due to the construction of the wedges 26 and the provision of the elastically yieldable, spring-like member 52, the nozzle 10 is subject to substantially no deformation due to thermal expansion during operation.

Again referring to FIGS. 1 and 2, it will be seen that a relatively thin layer or coating 30 is provided between the wedges 26 and the elastically yieldable metallic load carrying member 52 and between the annular member 50 of pyrolytic graphite. The layer 30 which may be termed a diffustion barrier has the characteristics of preventing the flow or diffusion of gases, such as oxygen, hydrogen and nitrogen, and the passage of carbon therethrough and into contact with the metallic support member 52 for preventing oxidation, embrittlement and carburization of the metallic member 52. Thus, the diffusion barrier 52 serves as a protective layer which prevents contamination of the metallic member 52 from the gases or carbon so that these members will not fail during operation of the nozzle 10. This feature is particularly significant insofar as the metallic member 52 is concerned since said member 52 must retain its characteristics for supporting the wedge members 26 and for permitting restrained expansion between the wedge members 26 so that for example, the circumferential or hoop stresses during firing of the nozzle will not build up in the wedge members 26 to cause failures of said wedge members 26. The material of the diffusion barrier 30 must be such that it does not become embrittled or otherwise subject to failure during rocket operation. The layer 30 may be comprised of an aluminum tin composition or compositions of vanadium, columbium, zirconium and alloys thereof, although other suitable materials may be used which have the above explained characteristics of preventing flow or diffusion of engine gases into contact with the annular expansible support member 52. At the same time the material of the barrier 30 must be such that it itself is not affected by said gases to cause this material to rupture under load.

The nozzle 10 is also provided with an annular shaped housing or load carrying member 15 which may be composed of an insulating material for keeping the outer surface of the nozzle 10 relatively cool. The substantially annular housing member 15 may be composed of any suitable insulating material which will prevent radiation of heat in a radially outward direction relative to the nozzle axis or in other words radially outwardly from the first layer or wedge construction 26. In addition to an outer housing member 15, a sleeve or plurality of sleeves 56 may be provided in surrounding engagement on the radially outward side of the first layer as illustrated in FIGS. 1 and 2. The sleeves 56 are composed of pyrolytic grapsite formed by deposition on a cylindrical surface so that in a radial direction relative to the nozzle axis the sleeve 56 is relatively highly thermally non-conductive.

Thus, the sleeve 56 serves as a radial insulating member for preventing heat from radiating radially outwardly from the first layer. The sleeve 56 is relatively highly thermally conductive in a circumferential and axial direction relative to the nozzle axis so that the sleeve 56 will aid in conducting heat axially for preventing a heat build-up in the first layer. Thus, the sleeve 56 aids in improving the heat conducting characteristics of the first layer.

During operation or firing of the nozzle 10 a substantial amount of heat is generated by combustion in a combustion zone 12 which heat acts on the entire inner surface 24 of said nozzle during passage from the combustion chamber of the rocket engine for discharge at the aft end of the nozzle toward the exit of the exhaust discharge portion 14. As explained above, heat conduction is relatively high in the axial and radial directions in the first or inner layer 26 which as illustrated in the drawings occupies a substantial portion of the entire diameter or radial depth of the exhaust nozzle 10. Because of the thickness of the first layer 26 and the heat conduction characteristics thereof, the first layer forms an excellent heat sink for conducting heat away from the inner surface 24 and thereby reducing the possibility of erosion of said inner surface 24. Because of the annular member or ring of pyrolytic graphite 50 at the upstream end of the first layer and the insulating means surrounding the outer periphery of the nozzle either through the layer 56 or other insulating means such as the housing 15, heat flow at the axial upstream region of the first layer 26 and in the radially outward portions thereof is limited while the discharge end of the nozzle heat flow is substantially unlimited. Under normal circumstances the discharge end of the nozzle is exposed to cooler outside temperatures and thus, the discharge end is normally relatively cooler which permits the heat which is conductd axially through the first layer to radiate outwardly from the discharge end of the nozzle. This is particularly significant during cool-down periods between firings since the heat is intentionally limited from conduction radially outwardly and axially upstream of the first layer and the heat therefore will be conducted axially toward the discharge end of the nozzle for radiation out of said nozzle. It should be understood that, although only one nozzle 10 is shown in FIG. 1, a plurality of such nozzles could be supported in a cluster around the aft end of a rocket vehicle.

It has been found that, if a cooling medium is passed between the wedge members and adjacent to the inner surface thereof, the operating temperatures at which the wedge construction can be used is substantially increased. With the ever increasing search for more powerful propellants, both of the liquid and solid types, the temperature range capabilities of rocket structures including exhaust nozzles must be correspondingly increased. Thus, the concept of the invention provides for a substantial increase in the temperature range to which rocket engines and exhaust nozzles using the wedge type construction of the invention can operate.

It will be seen that each of the wedges 26 is provided with a channel or cutout 58 to form a passageway 60 between the adjacent wedges which passageway extends the entire length of the abutting wedge members 26. It will also be seen that the cutback portions or the undercuts 27 in each of the wedge members 26 also allows for a passageway 62 between adjacent wedge members 26.

Means (not shown in FIGS. 1 and 2) are provided for supplying the passageways 60 and 62 with a fluid coolant for transferring heat from the wedge construction to the cooling medium which is then removed by said cooling medium upon discharge from said wedge construction. A coolant inlet supply conduit 64 is suitably connected to the rocket engine casing 17 or to the nozzle casing 15 for supplying a coolant to an annular inlet manifold 66. The coolant, which is normally supplied under pressure, is then permitted to flow through openings 68 provided in the annular member 50 and into a manifold 70. The manifold 70 is in communication with the passageways 60 and 62 in the wedge layer 26 so that the coolant will flow from the manifold 70 into the passageways 60 and 62 and substantially axially through the nozzle 10 and into a discharge manifold 72 for discharge from the nozzle 10 through an outlet conduit 74. The coolant may then be passed through a suitable cooling device and then recirculated. The cooling medium may be of any suitable type liquid or gas. It should be understood that the novel construction illustrated in FIGS. 1 and 2 as an exhaust nozzle may also be embodied in a complete rocket engine.

FIGS. 4 and 5 schematically illustrate liquid propellant systems wherein the pressurizing gas for the liquid propellants is also used as the coolant for the exhaust nozzle or alternatively for a rocket engine wedge construction. In said FIG. 4 there is shown a gas storage tank 76 which contains a gas, such as nitrogen, under pressure. A regulator valve 78 is connected in the line 80 leading from the tank 76 along with a solenoid valve 82 which is reponsive to a thrust demand signal for permitting gas flow from the tank 76 to be turned on and off or regulated in accordance with the thrust demand signal. This structure, as will be apparent, is conventional in liquid propellant systems. The pressure line 80 is suitably connected to the inlet conduit 64 in the nozzle 10 for supplying the gas to the manifold 66. Upon discharge of the heated gas through the outlet conduit 74, the heated gas is conveyed through a suitable check valve 84 and then to the propellant tanks 86 and 88 for pressurizing said tanks in order to feed the propellants to the combustion chamber in a well known manner. Thus, it will be seen that the same pressurizing gas, which is used for pressurizing the propellant tanks, is also used as the cooling medium for the exhaust nozzle wedge construction which has the advantage of requiring a minimum amount of weight for accomplishing two important functions in the propellant system.

In FIG. 5 there is shown another liquid propellant system which is designed for intermittent operation. The system of FIG. 5 is substantially identical to FIG. 4 with the only exception being that each of the propellant tanks is provided with a heat exchanger 90', which may be of a known type. The heat exchangers 90' provide for dissipation of the heat from the cooling and pressurizing gas as it enters the tanks 86' and 88' so that the pressure of the gas fed to the tanks will be uniform from firing to firing of the rocket engine since between firing periods the gases in the lines may cool at different rates thus resulting in a non-uniform pressure. The heat exchangers 90' remove heat from the gas and dissipate the heat to preheat the propellants thus also aiding in making the combustion process more efficient.

In FIG. 3 there is shown a complete rocket engine 10' which has a construction similar to the exhaust nozzle 10 of FIG. 1 with said rocket engine 10' embodying means for passing a coolant between the wedges 26' similar to that illustrated in FIG. 1. As stated above, it should be understood that each of the embodiments of the invention has application in either a complete rocket engine or in only the exhaust nozzle portion of a rocket engine and the drawings show one or the other construction merely for purposes of illustration.

In addition to the similar construction shown in FIG. 3 with similar numerals to that shown in FIGS. 1 and 2, the rocket engine 10' is supported on a support structure by means of an extension 36' on the expansion member 52'. The extension 36' is suitably bolted, as by bolts 42', to support plates 38' and 40'. Suitable insulation 44' is provided between support plates 38' and 40' to insure that the axial outer end of the support housing remains cool. Also, wafers or rings of pyrolytic graphite 46' are provided around the propellant mixing chamber 48' and are oriented as to be relatively highly thermally conductive in the radial direction for conducting heat away from the mixing chamber 48' so as to protect the injector mechanism (not shown) from damage due to overheating. The details of the support structure and fuel supply mechanism form no part of the present invention and it should be understood that the structure of the invention may be used with any suitable type fuel or support mechanism.

As in FIG. 1, the cooling medium in FIG. 3 is supplied through an inlet pipe or conduit 64' and is supplied to an inlet manifold 70' communicating with passageways 60' and 62' which are similar to the passageways shown in FIGS. 1 and 2. The coolant is supplied under pressure and flows from the inlet manifold 70' through the wedge layer 26' and, in the embodiment of FIG. 3, is discharged through an outlet opening 92' through the diffusion barrier 30' and the elastically yieldable member 52' and out into the outer environment. Since the coolant, which in this case is a gas, is heated during flow through the wedge construction 26', the coolant or gas will expand upon discharge into the outer environment and thereby provide a supplemental thrust to the rocket engine 10'. Thus, in this embodiment, the cooling gas provides the dual function of cooling the wedge construction 26' and providing additional thrust for the rocket engine 10'.

It is also within the scope of the invention to provide bleed openings in the passages 60' or 62' for bleeding off a portion of the cooling gas into the gas flow path provided by the inner surface 24'. By this means the cooling gas will form a cooling film adjacent the inner surface 24 for further reducing the temperature of said inner surface 24'. Preferably the gas is bled off upstream of the throat portion 28' so as to provide a cooling film in the region of said throat portion 28' which as is well known is the region of highest temperature.

FIG. 6 schematically illustrates a liquid propellant system which may be used in the embodiment of FIG. 3. In said FIG. 6, gas storage tank 76" containing a gas under pressure is provided for pressurizing the propellants in tanks 86" and 88". As in FIGS. 4 and 5, a regulator valve 78", feed line 80", a solenoid valve 82" and a check valve 84" are provided for controlling the flow of gas to the tanks 86" and 88". It will be seen that these components in FIG. 6 are connected directly to the rocket engine 10" instead of also supplying cooling gas to the engine. Since in the embodiment of FIG. 3 the cooling gas is discharged directly to the outer environment, a separate cooling gas supply is preferably provided and may take the form of that illustrated in FIG. 6. The separate cooling gas supply may comprise a gas storage tank 94" containing a gas under pressure such as hydrogen, a regulator valve 96", feed line 98" a solenoid valve 100" and a check valve 102" all of which are similar to elements 76"–84" and may be operated in conjunction therewith. The cooling gas for the passages 60' and 62' may however, be provided from the main storage tank 76", if desired, with a larger tank being used to provide additional gas.

It will be apparent from the description of the embodiments of FIGS. 1–6 that operating capacity of the pyrolytic graphite wedge type construction is substantially increased by the additional use of a cooling medium in the manner set forth while providing a dual function for cooling medium in each case. It will also be apparent that the invention as set forth in FIGS. 1–6 offers operational capabilites in temperature ranges substantially beyond the capabilities of rocket engines and exhaust nozzles previously known due to the novel application of pyrolytic graphite as a heat sink construction.

In the above detailed description of the invention a novel restartable rocket engine has been described which is also capable of numerous restarts. Although the invention has been described in connection with a rocket engine or exhaust nozzle, it will be obvious however, that a structure of the invention has application for other purposes such as a heat shield for other parts of aircraft or in other applications where extreme temperatures are encountered.

While the invention has been described in detail in its present preferred embodiment it will be obvious to those skilled in the art, after understanding the invention, that various changes and modifications may be made therein without departing from the spirit and scope thereof. For example, instead of being used with a liquid fuel system, the rocket engine of the invention also has application with solid fuels and also may be provided with ignition means for igniting fuels which may be of a type other than the hypergolic fuels described above. It will also be apparent that the inner surface of the construction shown may also be provided with a coating or layer of a refractory material for providing further protection for said inner surface. It is intended in the appended claims to cover all such modifications.

I claim:

1. In a rocket engine or the like having a multi-layer casing structure for the engine combustion chamber and combustion gas discharge nozzle with a convergent-divergent profile; said multi-layer casing structure including a first annular layer having a profile defining the inner surface of said combustion chamber and said exhaust nozzle, said first layer comprising a plurality of individual segments circumferentially disposed in side-by-side relation to form an annulus, said segments being composed of an anisotropic material with said segments being oriented so that said first layer is relatively highly thermally conductive in directions both parallel and radial relative to the rocket engine axis; and passage means between adjacent segments of said first layer with said passage means being disposed adjacent the inner surface of said rocket engine at least in the throat region of the discharge nozzle and means for passing a coolant through said passage means so that said segments of said first layer are cooled by said coolant passing through said passage means.

2. In a rocket engine as recited in claim 1 wherein said coolant comprises a gas supplied under pressure to said passage means and discharge means at one end of said passage means for discharging said gas into the outer environment after said gas passes through said passage means so that said gas upon discharge from said discharge means expands into the outer environment to provide thrust to said rocket engine.

3. In a rocket engine as recited in claim 1 wherein said passage means extends from a region upstream of the throat region of said nozzle to a region downstream of the nozzle throat region.

4. In a rocket engine as recited in claim 1 wherein each said segment comprises a wedge-shaped member having one face thereof cut back from a region adjacent its radially inner end toward its radially outer end and having a land portion on said face at the radially inner end thereof for abutting an adjacent wedge-shaped member to form a gas-tight inner surface and said passage means comprising a groove cut into said one face radially outwardly of said land portion and adjacent thereto so that the coolant during passage through said passage means will pass in substantially close proximity to the inner surface of said exhaust nozzle.

5. In a rocket engine as recited in claim 1 wherein each said segment comprises a wedge-shaped member having one face cut back to form an undercut portion from a region adjacent the radially inner end of said wedge-shaped member to its radially outer end and each said wedge-shaped member having a land portion on said one face at the radially inner end thereof for abutting an adjacent wedge-shaped member to form a gas-tight inner surface, and each said undercut portion forming a passageway between adjacent wedge-shaped members for passage of the coolant therethrough.

6. In a rocket engine as recited in claim 1 wherein said individual segments are composed of pyrolytic graphite.

7. A rocket engine including a combustion chamber and an exhaust nozzle for discharge of gases from said combustion chamber; a first layer comprising a plurality of individual elements composed of an anisotropic material with each said element being oriented so that it is relatively highly thermally conductive in a direction including a first group of planes and relatively thermally non-conductive in a direction perpendicular to said first group of planes, said elements of said first layer being arranged in stacked side-by-side relationship to form an annulus the inner surface of which defines at least one portion of the inner surface of said rocket engine; and means for passing a cooling fluid adjacent to said inner surface at least in said one portion of said inner surface such that said cooling fluid serves to reduce the temperature of said inner surface at said one portion, said means for passing a cooling medium adjacent to said inner surface including axial passage means disposed between adjacent pairs of said individual elements.

8. A rocket engine as recited in claim 7 wherein said passage means extends axially from the upstream end of said combustion chamber through said exhaust nozzle, said passage means including discharge means at its downstream end for discharging said cooling fluid into the outer environment and said cooling fluid comprising a gas, so that as said gas is discharged into the outer environment said gas provides thrust to said rocket engine.

9. A rocket engine as recited in claim 7 wherein each said individual element comprises a wedge-shaped member composed of pyrolytic graphite.

10. A rocket engine as recited in claim 9 wherein said wedge-shaped member has an undercut portion on one side face thereof with said undercut portion extending from the radially outer end to a region adjacent the radially inner end of said wedge-shaped member and said wedge-shaped member having a land portion on its radially inner end for abutting an adjacent wedge-shaped member of said first layer such that a gas-tight seal is provided at the inner surface of said first layer.

11. A rocket engine as recited in claim 10 wherein said undercut portions form passageways between adjacent wedge-shaped members for receiving said cooling fluid so that said cooling fluid is passed between said wedge-shaped members and adjacent to said inner surface.

12. A rocket engine as recited in claim 9 wherein each said wedge-shaped member has a groove cut into one face thereof with said groove being adjacent to but spaced from the inner surface of said wedge-shaped member, said groove forming a passageway for guiding said cooling fluid through said first layer.

References Cited by the Examiner
UNITED STATES PATENTS

| | | | |
|---|---|---|---|
| 2,701,441 | 2/1955 | Mitchell | 60—39.48 X |
| 3,224,193 | 12/1965 | Loprete et al. | |

References Cited by the Applicant
UNITED STATES PATENTS

| | | |
|---|---|---|
| 2,392,682 | 1/1946 | Marek. |
| 2,644,296 | 7/1953 | Sanz et al. |
| 2,789,038 | 4/1957 | Bennet et al. |
| 2,856,820 | 10/1958 | Schmued et al. |
| 2,958,184 | 11/1960 | Sanders. |

MARK NEWMAN, *Primary Examiner.*

D. HART, *Assistant Examiner.*